United States Patent [19]
Winston

[11] Patent Number: 5,347,949
[45] Date of Patent: Sep. 20, 1994

[54] LANDLOCKED FLOATING HOUSE

[76] Inventor: Paul K. Winston, 9401 E. Chenango, Englewood, Colo. 80111

[21] Appl. No.: 148,580

[22] Filed: Nov. 8, 1993

[51] Int. Cl.⁵ .................................. B63B 38/00
[52] U.S. Cl. .................. 114/264; 52/169.2; 52/169.9; 114/267
[58] Field of Search ............... 114/264, 266, 267; 405/196, 197, 195; 52/64, 169.2, 169.9

[56] References Cited
U.S. PATENT DOCUMENTS

| | | | |
|---|---|---|---|
| 2,429,381 | 10/1947 | Watson | 114/264 |
| 3,166,037 | 1/1965 | Otis | 114/267 |
| 4,117,691 | 10/1976 | Spray | 114/264 X |
| 4,381,723 | 5/1983 | Furst | 114/45 |
| 4,565,149 | 1/1986 | Clasky | 114/264 |
| 4,691,656 | 9/1987 | Katernberg et al. | 114/45 |
| 5,131,109 | 7/1992 | Grip et al. | 14/28 |
| 5,147,148 | 9/1992 | White et al. | 405/199 |

Primary Examiner—Sherman Basinger

[57] ABSTRACT

An exclusively dry-land based modular housing unit intended for construction in floodwater-prone areas is factory built, utilizing wooden post-tension-frame construction for superior unit rigidity, and a sheathed, modular, solid foam whole-house float resides at the underside of the housing unit. A series of wooden piers serve as the housing unit fixed foundation preceding floodwater conditions. Additionally, a series of lubricated, oscillation damping, telescoping piers reside below the housing unit perimeter, and are securely and permanently connected to the perimeter beams, to serve as station keeping anchors for the housing unit during floatation and floodwater conditions. The housing unit is provided with integral water purification, septic, heating, and electrical backup systems for use during extended floodwater conditions.

1 Claim, 14 Drawing Sheets

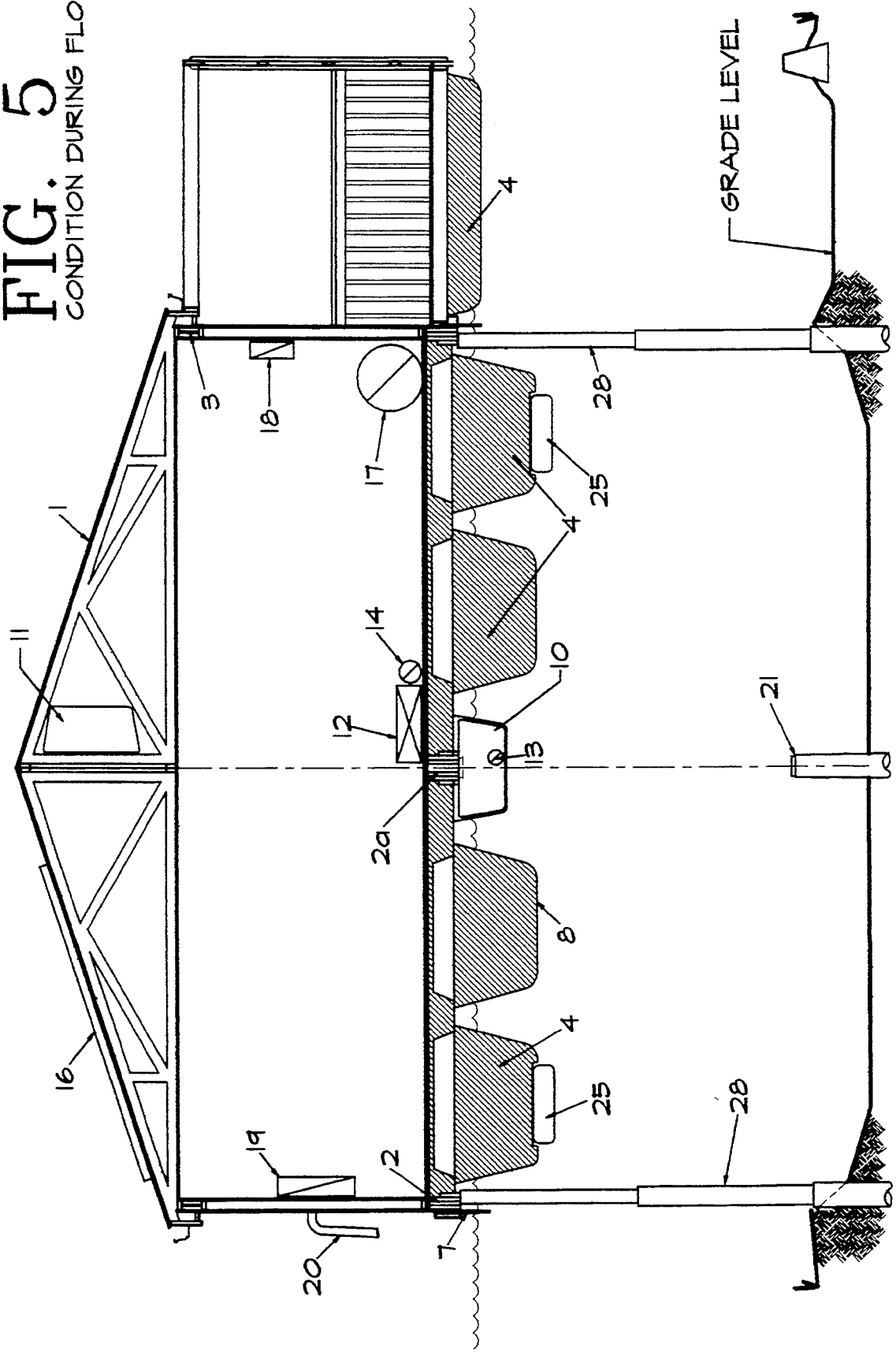

LANDLOCKED FLOATING HOUSE

FIELD OF THE INVENTION

The field of the present invention relates to the art of land based residential dwellings, small commercial buildings and the like, and particularly relates to those buildings desired to be placed within a known flood plain area, bay shores, or estuaries, normally dry land whose water level is periodically subject to radical and sudden change and rough weather. The present invention specifically relates to a vertically moored, anchored, oscillation dampened, floatable housing unit, which is exclusively and primarily dry land based, and which housing unit is substantially visually similar to other, dry land based non-floatable housing units in finish and appearance.

BACKGROUND OF THE INVENTION

As our "planetary village" grows, and the population with it, all available real estate is seriously considered for the building of residential and business use structures. To this end, a great population density is often found in areas near major water courses or ocean shores. This proximity provides for convenient shipping and transportation, recreation opportunities, environmental beauty, etc. Most often, these areas, including "riverbottom real estate" are among the most fertile farming areas available, and are very desirable for residences also. However, as present weather trends continue, these buildable areas near major watercourses become more and more subject to flooding and floodwaters, often severe, as was the case in the summer of 1993, in the American Mid-West lands.

When a building site is chosen near a watercourse, bay or estuary, which is subject to periodic floodwaters, traditional and conventional construction techniques require the placement of several fixed piers or pilings under the structure, to serve as an elevated foundation for the structure. These fixed piers permanently elevate the structure to a predetermined height above grade level. Oftentimes, a decorative skirting is added, to obscure the relatively unsightly pilings. This traditional building technique provides for a housing unit which is permanently supported off the ground and allows for a predetermined degree of floodwater to pass under the house, without actually flooding the house itself. This traditional system of flood plain construction essentially is that of a shore-based dock, and this method of riverbottom housing construction has been in use since the time of early civilization without change, as it has served well.

In very calm floodwaters, or in shallow floodwater conditions, this previous construction technique performs adequately. However, during periodic high floodwater conditions, oftentimes the housing unit can become flooded, even though it is elevated. During this time of flooding, the dwelling becomes uninhabitable, and usually suffers internal damage. In addition, this construction technique permanently places the dwelling high above grade level, where it then becomes necessary for a resident or visitor to climb or descend a large number of steps to enter or exit the dwelling—a necessary inconvenience predicated by the construction technique. Further, this traditional construction arrangement prevents or disallows convenient habitation by invalids or wheelchair housing unit owners.

Other previous techniques of providing for a "stabilized floating platform" are illustrated by the prior art references presented following. These techniques embody structures which intentionally have been designed exclusively for use on existing bodies of water, such as: U.S. Pat. No. 4,381,723, by inventor Jon Furst of St. Johns Canada, assigned to Nordco, Canada which discloses a Submersible dry-dock for use in lifting ships and boats for service; U.S. Pat. No. 4,691,656 from inventors Helmut Katemberg and Ingolf Köhler of Federal Republic of Germany, assigned to MAN Germany, which discloses a floating dock for use in repairing ships and the like; U.S. Pat. No. 5,131,109 invented by Bertil and Evert Grip of Sweden, assigned to Bertil Group, Sweden, which discloses a pontoon bridge with automatic height adjusting and locking systems, for use at in-fill river water bridging needs, and U.S. Pat. No. 5,147,148 by inventors Charles N. White and Riley G. Goldsmith of Houston Texas, assigned to Texaco Inc, which discloses a heave restrained offshore oil drilling platform for use in rough waters. These references are brought to light as embodiments of state of the art moored platforms which are intended to be utilized in bodies of water, and these embodiments are not intended or designed to be utilized on dry land, as is the intent of the present invention.

Disclosed by the applicant to the PTO on Aug. 12, 1993 in a package submitted under the Disclosure Document Program, document #337,045, it is a primary object of the present invention to provide for a floatable housing unit for use in floodwater-prone areas, which overcomes the aforesaid disadvantages exhibited to this end by the prior art described above, by providing for an exclusively dry land based, grade level built, releasably moored, post tension frame, prefabricated, stabilized, floatable housing unit which utilizes contained solid foam as a floatation element, and is secured and anchored to the building site through the use of a series of extendable pier, shock absorbing foundation segments, in combination with a series of wooden pilings which serve as a fixed dry land foundation, and which housing unit is self contained with backup utility systems on board.

SUMMARY OF THE INVENTION

In its simplest form, the present invention relates to an exclusively dry land based floatable housing unit, of wooden post tension frame construction. A solid foam floatation means is securely fastened to and connected below the housing unit floor joists, and the floatation means fully extends to the outer perimeter of the housing unit. This floatation unit is biased in thickness toward the heavier portion of the housing unit, to provide level floatation, and the floatation means has sloping side faces to assist in deflecting water flow. The floatation element is protected and contained by an external liner membrane. Several lined cavities located adjacent to the floatation means serve as liquid holding tanks for the water supply backup systems on board the housing unit.

A series of wooden piers serve as dry land foundation means, underlying the housing unit, and the floatable housing unit releasably rests upon these wooden piers during times of non flood conditions. These wooden piers are driven into the earth to a depth according to the density of the ground at the site. An anchoring and guide means is provided for guiding the floatable housing unit between the raised position encountered during floodwater conditions and the lowered position encountered during dry times.

The anchoring guide means are provided in the form of 4 or more hollow, round, telescoping and extendable tubing piers which are constructed in multiple segments that compress to an overall height of approximately 12 feet in length, and which nest snugly inside one another when the floatable housing unit is in lowered position. Conversely, the extendable piers fully extend to approximately 20 feet in length when the housing unit is in raised position during floodwater depths of approximately 18 feet above normal water levels. A shock absorbing and dampening means is incorporated into the design internal to the segmented piers. When the floodwaters reaches the floatation, the housing unit begins to rise. The telescoping piers serve to reliably and securely vertically position the housing unit over the wooden pilings as the house continues to rise. The telescoping pier segments fill with water to provide a hydrology system that will act as a shock absorber to smooth out any sudden up or down movements experienced by the house as it is rising on the floodwater.

The uppermost portion of the extendable pier guide and anchoring means are securely connected preferably inboard to the corners of the housing unit perimeter beams, and lowermost, are set into concrete footings which reside in the earth. The housing unit is finished inside and out in the conventional manner, and a set of flexible utility connectors is employed to allow for a degree of movement without interrupting service.

BRIEF DESCRIPTION OF THE DRAWINGS

FIG.5 is a cutaway side view of the housing unit showing backups.

DETAILED DRAWINGS DESCRIPTION

Figure 1:
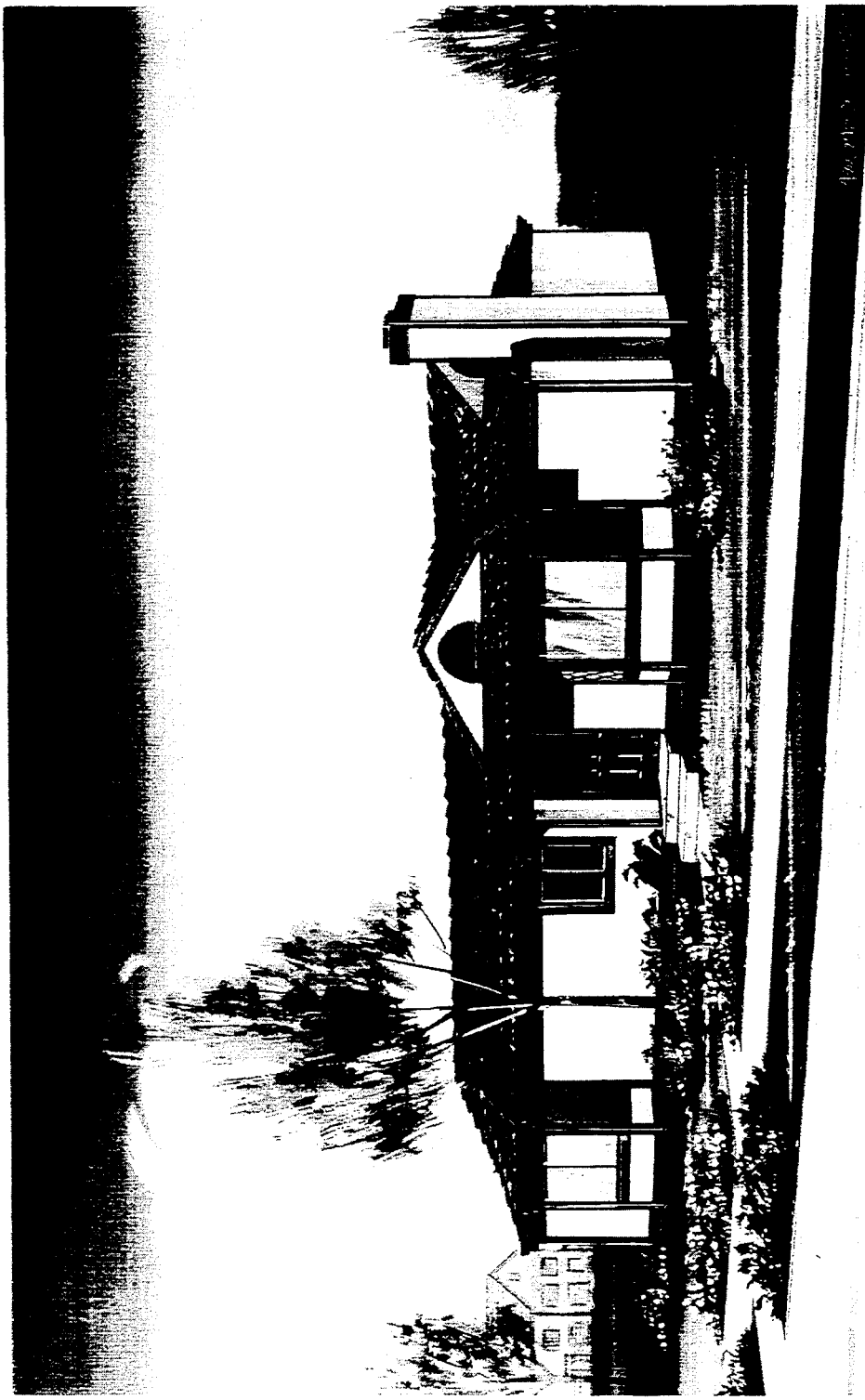
FIG. 1 is a front elevation view of the floatable housing unit at rest.
Figure 2:
FIG.2 is a front elevation view of the floatable housing unit in float.
Figure 3:
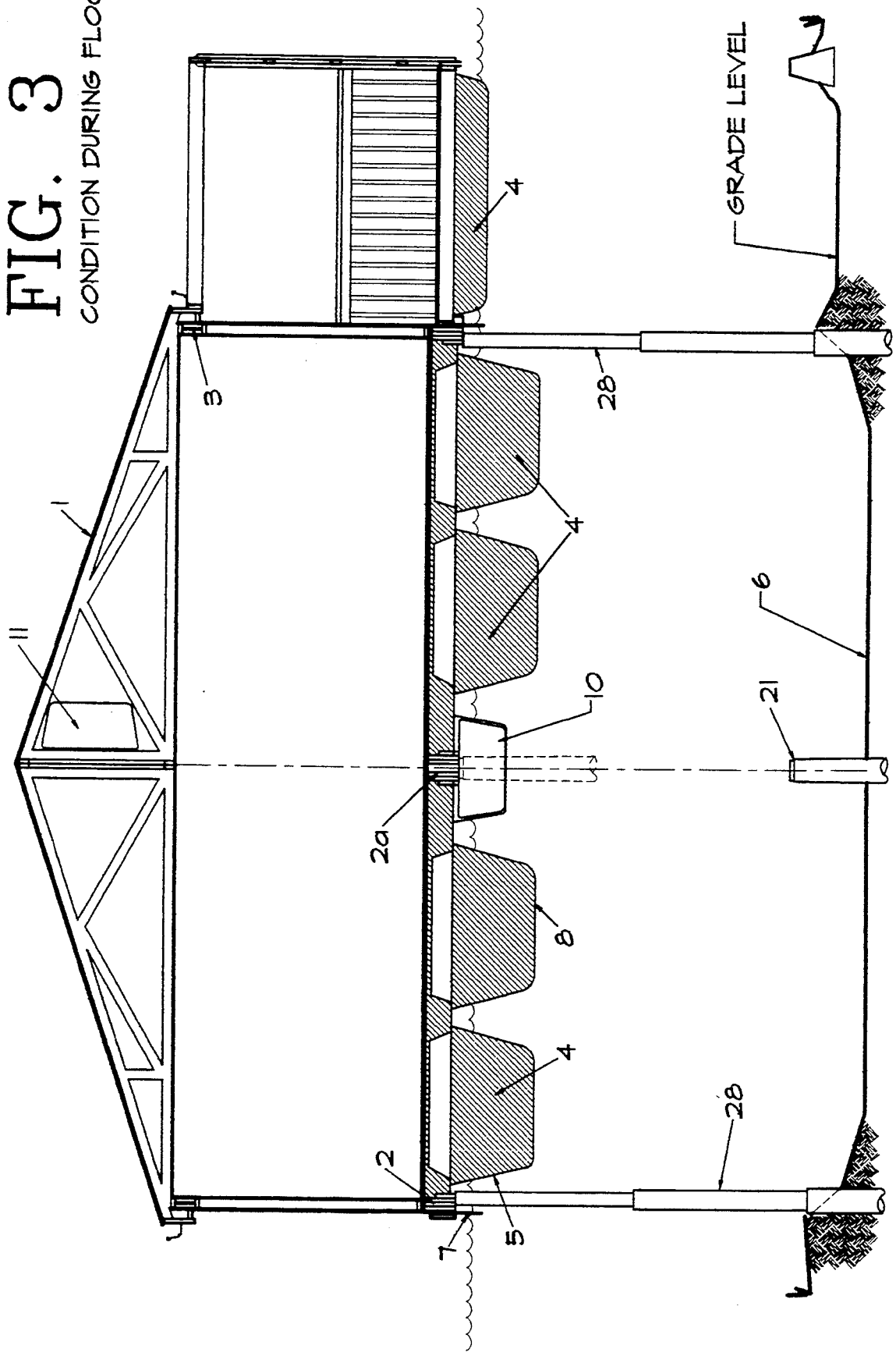
FIG.3 is a cutaway side view of the housing unit in floatation.
Figure 4:
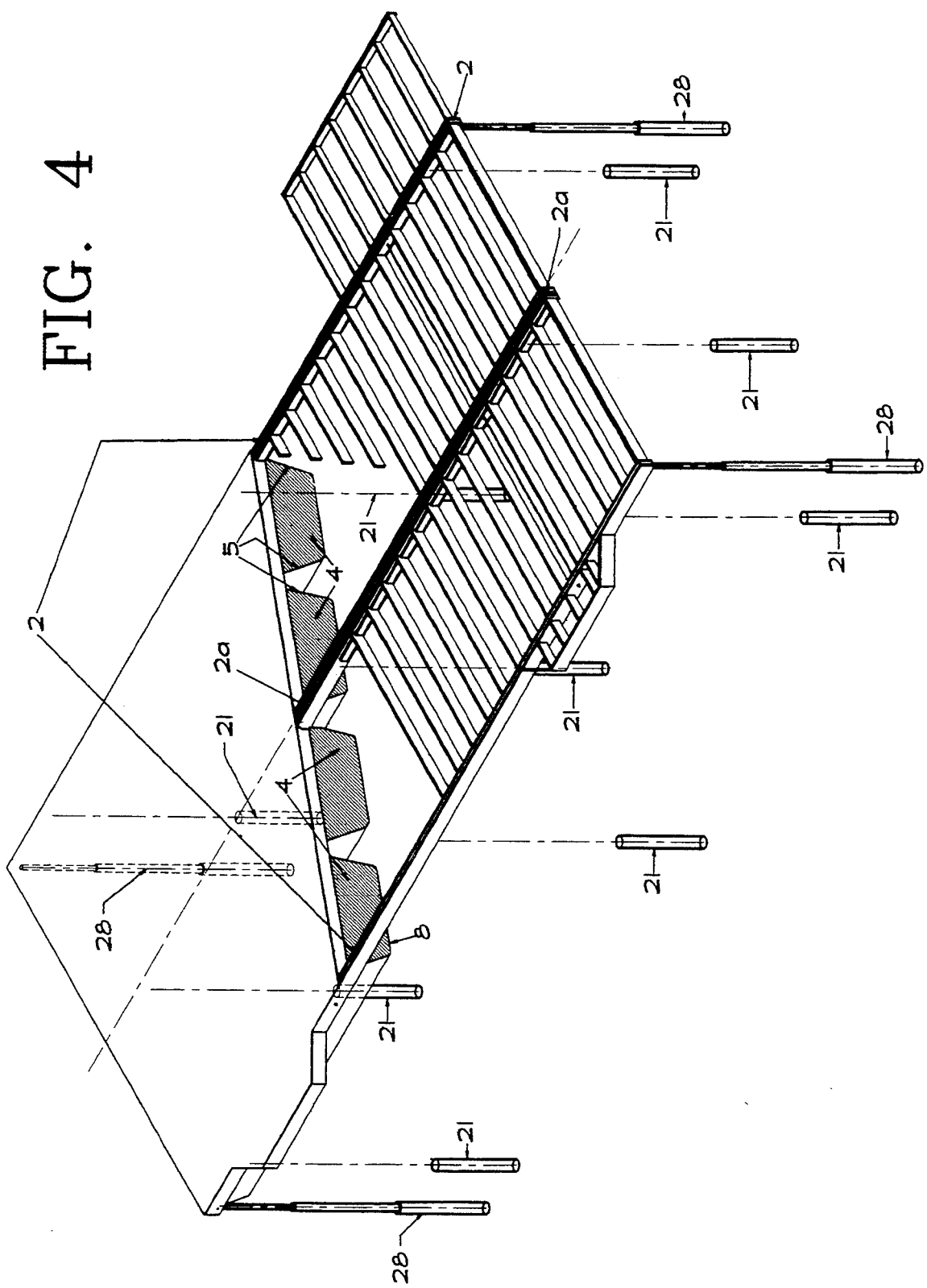
FIG.4 is an overhead view of the foundation and pier placements.
Figure 6A:
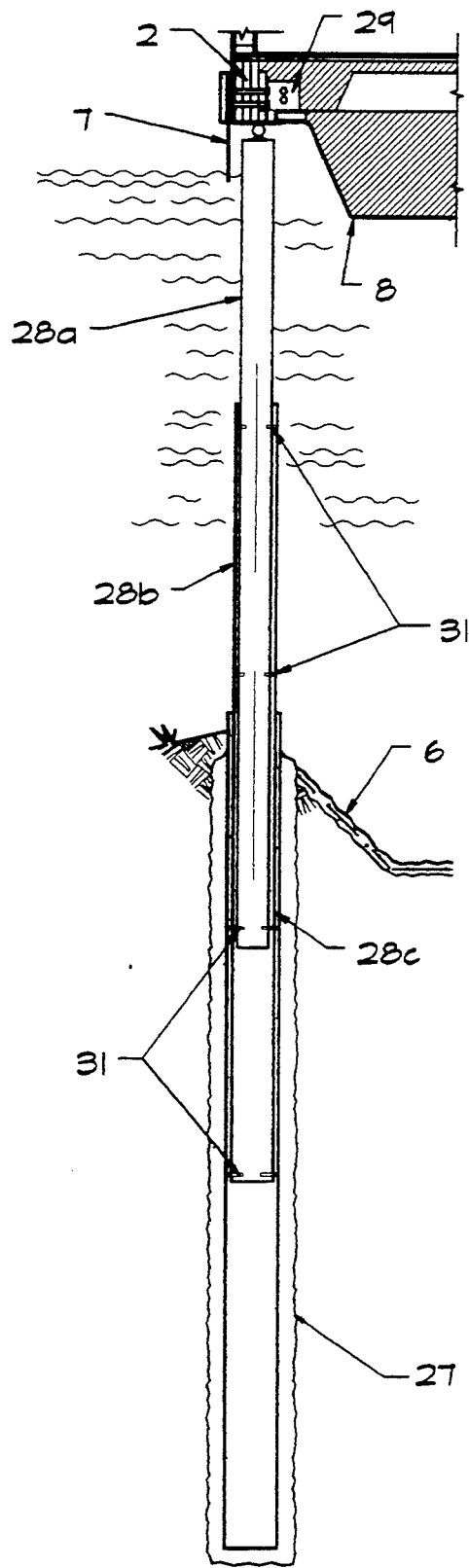
FIG.6 is an active side view of extendable pier, extended, then compressed.
Figure 6B:
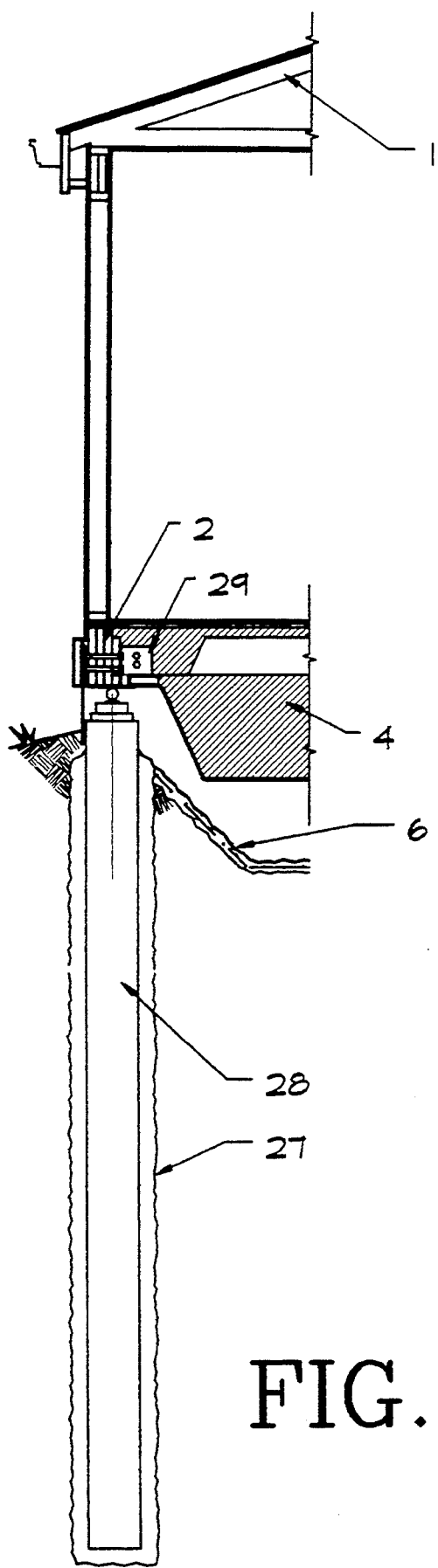
Figure 7:
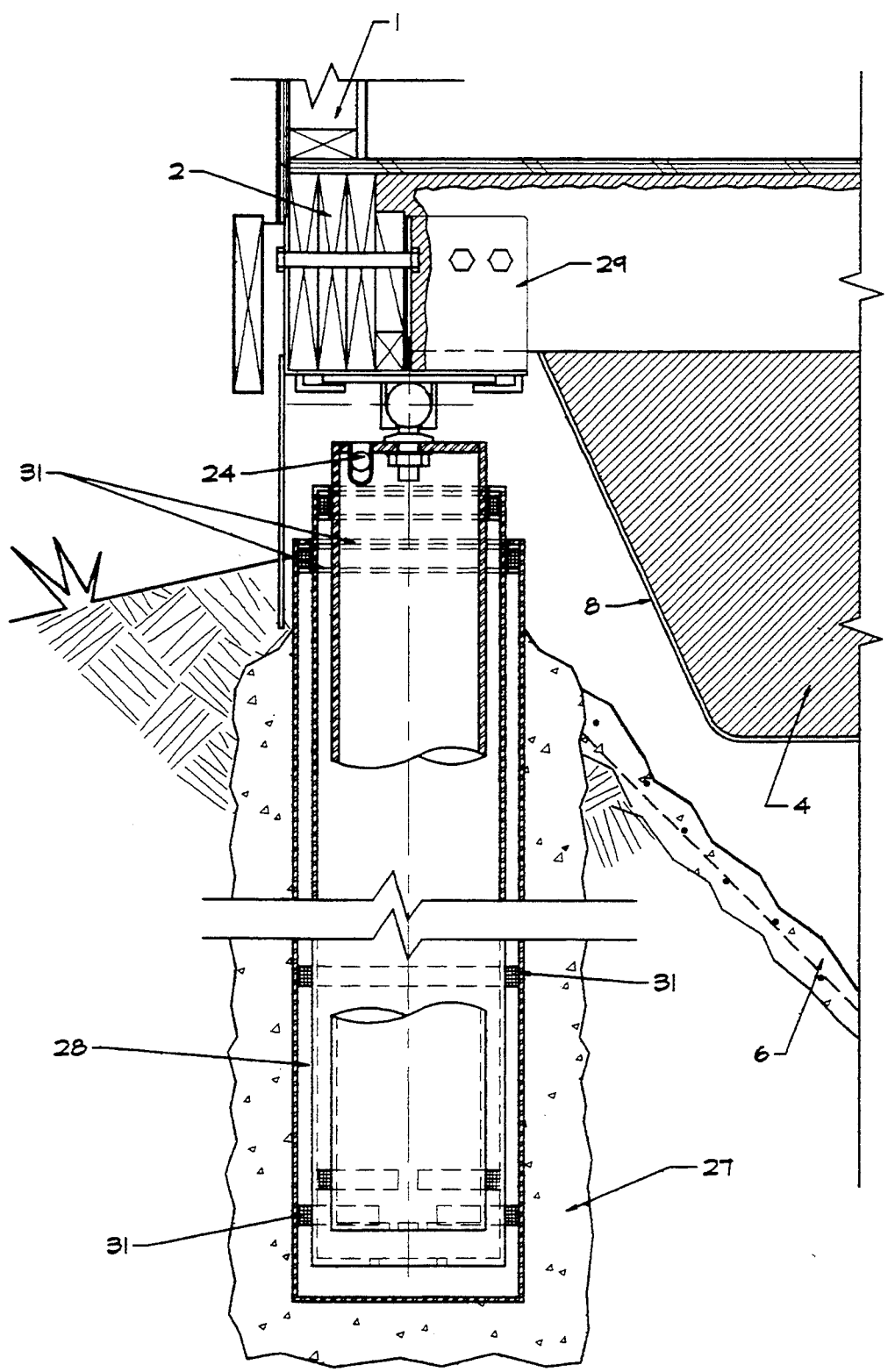
FIG.7 is a cutaway side view of extendable pier, compressed.
Figure 8:
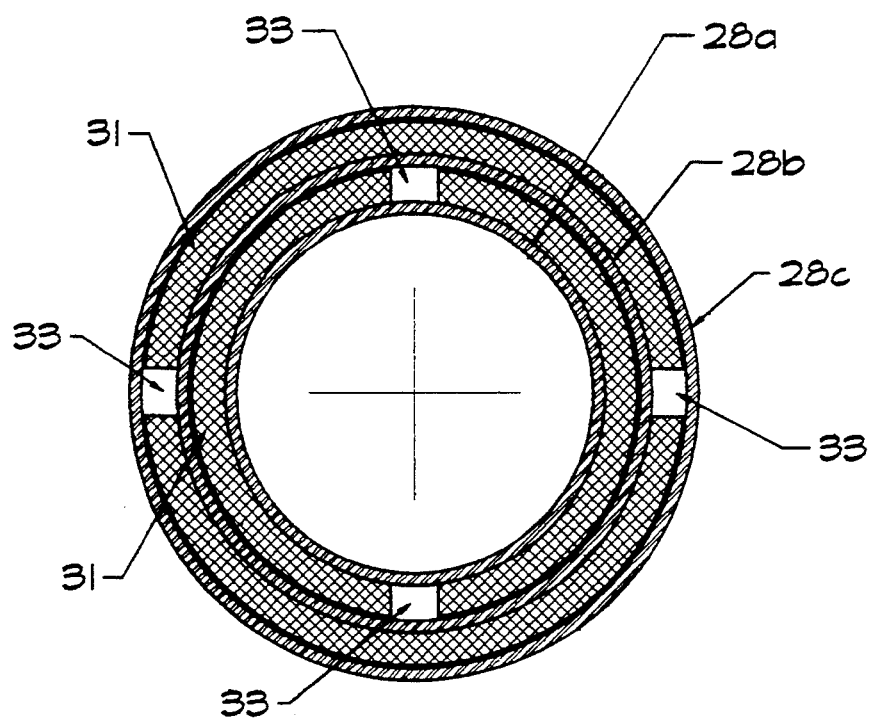
FIG.8 is a top view of extendable pier.
Figure 9:
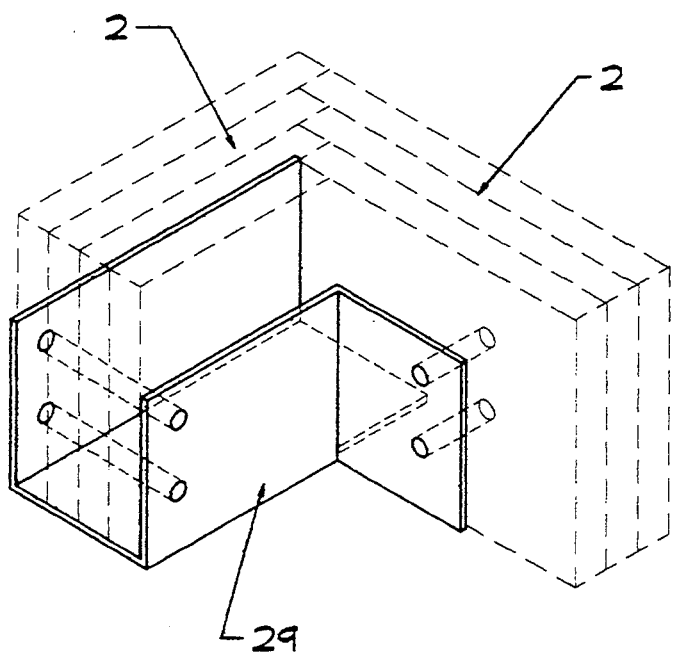
FIG.9 is an isometric view of the beam engaging bracket.
Figure 10:
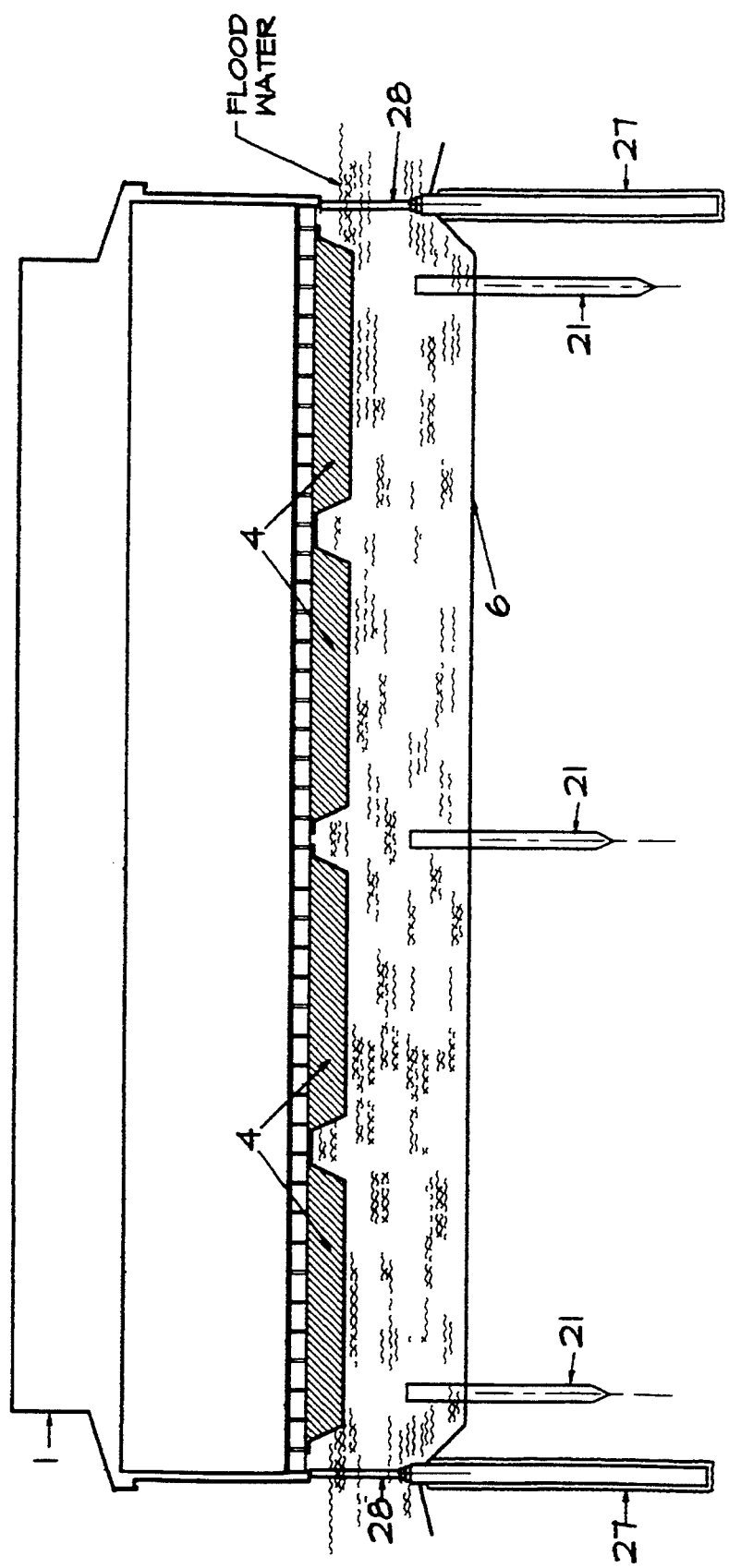
FIG.10 is a side elevation of a floatation design.
Figure 11:
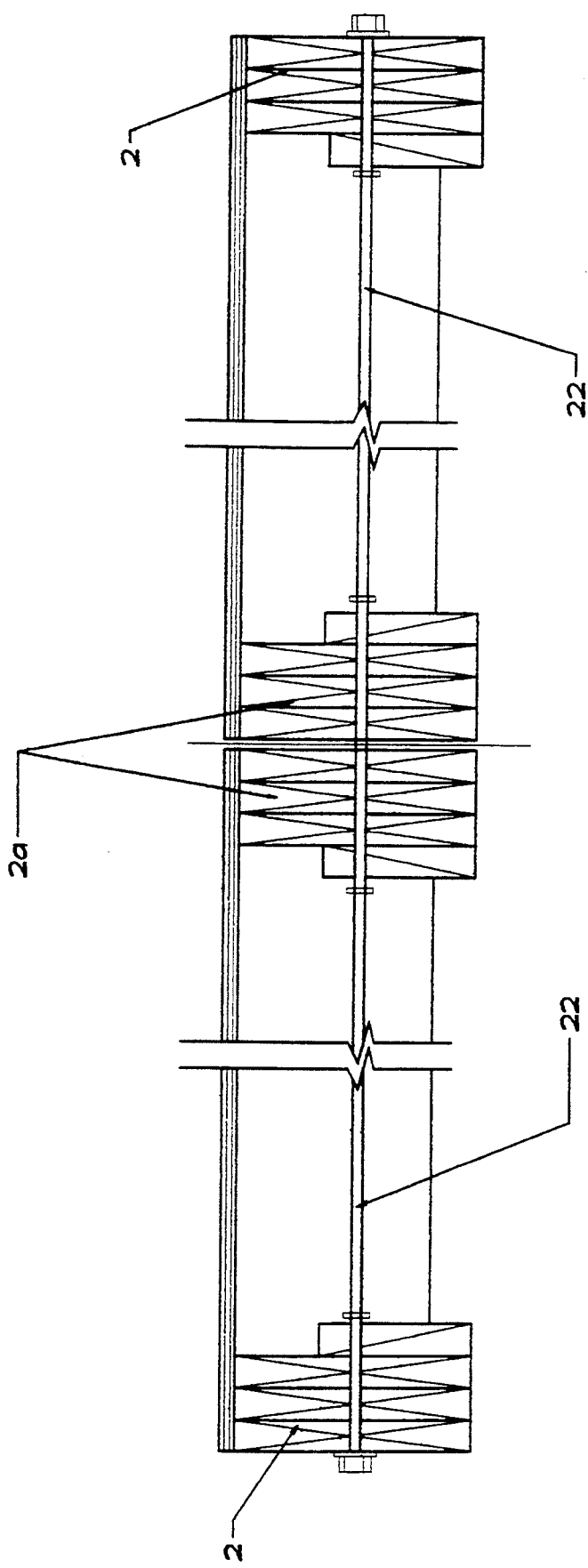
FIG.11 is a cutaway side view of the beams and post tension rod.
Figure 12:
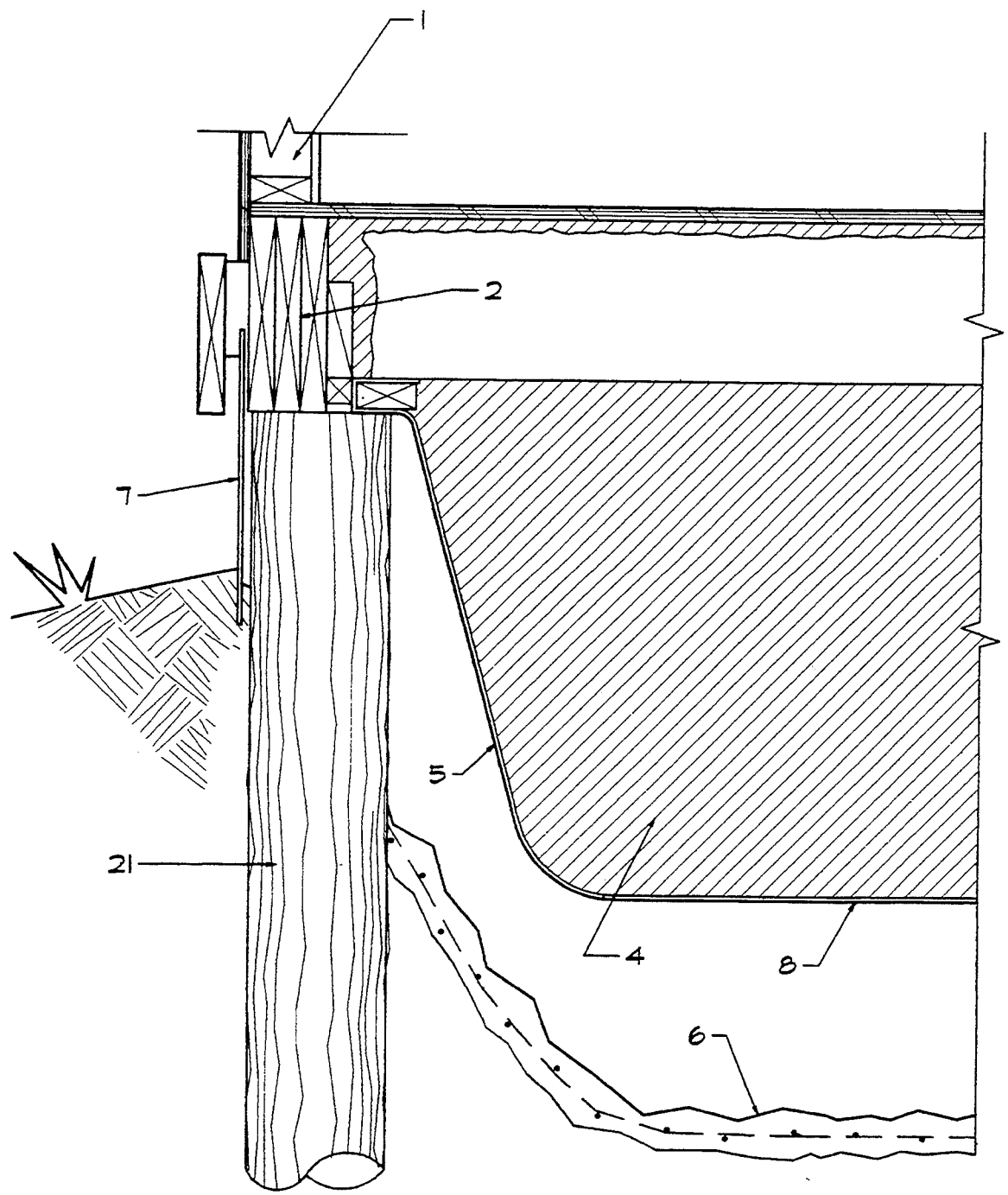
FIG.12 is a cutaway side view of a wooden pier and connection.
Figure 13:
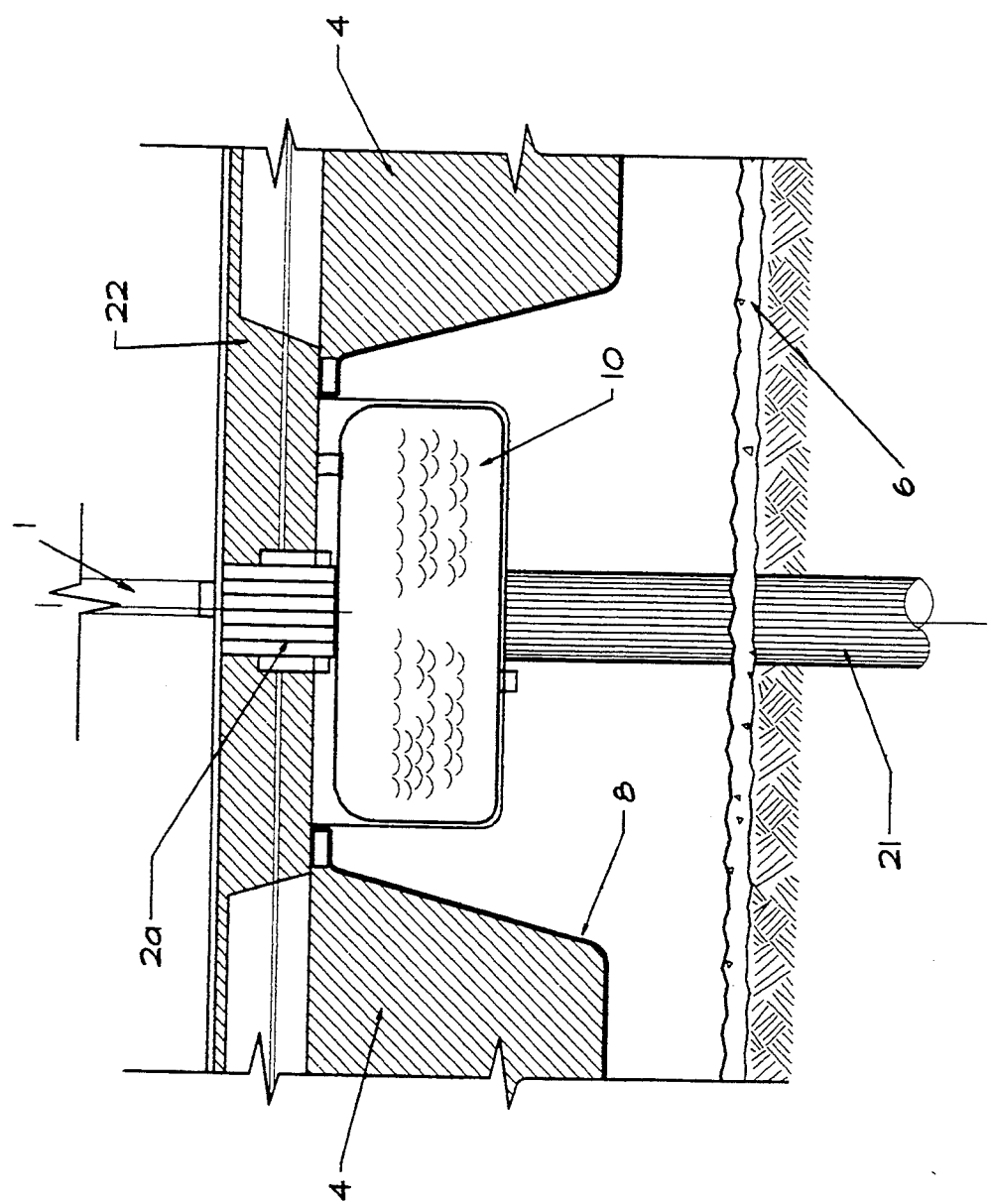
FIG. 13 is a homing unit cutaway along the centerline beam.

According to the primary embodiment of the present invention, a prefabricated modular housing unit 1 is placed upon real estate situated within a known flood water-prone area, estuary, or the like. The construction techniques employed in the modular housing unit 1 are unique in their structural integrity. The foundation perimeter is composed of four vertical laminated wooden beams 2, blocked and fastened to the conventional floor joist system in a manner as is known in the art. This building technique is known as "Wooden Post Tension Frame Construction". The post tension frame construction provides for a superior framework rigidity, incorporating pressure glued, laminated, 6"×12" perimeter wooden beams 2, and 12"×12" mid-section wooden floor beams 2a. The mid-section beams 2a result from the joining of the two halves of a modular housing unit 1 together. A series of three or more threaded steel clamping post tension rods 22, penetrates and spans the distance between the both of the opposing perimeter beams 2, and penetrates through the mid-section beam 2a assembly. The perimeter foundation beams 2 and the joist system are then locked together with the steel post tension rods 22, with locknuts, when the housing unit 1 is installed to the building site. Standard 2"×12" or 2"×8" floor joists complete the lower framework as is common in the art. Once tightened, the steel rods 22 make the foundation perimeter beams 2, the mid-section beams, 2a and the floor joist system one structural unit. The steel rods 22 securely join the two halves of the modular housing unit 1 together. The resulting framework is strong and rigid, and the entire housing unit 1 can be lifted after assembly with a crane by using four cables tied to the quarter points along the length of the perimeter floor beams 2.

Uppermost, a wooden perimeter header plate 3 construction is utilized as the housing unit 1 upper framework "bond beam". Typically, the perimeter header plate 3 is a wooden, pressure glued, and laminated 4"×8" construction. The perimeter header plate 3 provides additional housing unit 1 rigidity, and it is connected to the lower foundation perimeter beams 2 with wooden studs or the like, as is commonly known in the trades. Standard finish materials, and many differing floor plans are available to a housing unit 1 owner.

The housing unit 1 is then removably set on nine pressure treated pilings 21. The rot resistant wooden pilings 21 are preferably nine inches in diameter and eight to ten feet long. The wooden pilings 21 are driven into the ground to a distance dictated by the soil density, and project upwardly above grade level. Under dry, non-floodwater conditions, the wooden pilings 21 act as a leveling and foundation system for the housing unit 1.

The floatation element 4 consists of a multi-part plastic liner 8 filled with foam and attached to the foundation beams 2 of the housing unit 1. The liner 8 is approximately one eighth of an inch thick. The liner 8, which is preferably made from recycled plastic, is very strong and durable. When the housing unit 1 is delivered to the site, assembled, and placed on the wooden piers 21, the liner 8 is installed. It is carefully fastened inside the joist area and filled with expandable foam. The expandable foam flows inside the liner 8, and continues up into the joist cavity, sealing the bottom of the floor. The foam is applied in a liquid form and fills all of the empty spaces and cavities. When the foam makes contact with the air, it becomes as rigid as the floor joist increasing the structural integrity of the housing unit 1. Not only does the foam provide insulation and seal the wooden joist members located under the housing unit 1, it provides floatation for the housing unit 1.

The foam sealed in the plastic liner 8 acts like a life preserver. The key steps in designing for long-term floatation are (1) to determine the wave action that the housing unit 1 will be exposed to and (2) to calculate an adequate loadbearing area of foam based on the weight of the housing unit 1 to be supported. It is very important to determine the live and dead weight loads experienced during the floatation period. This dictates how much foam is needed to float these live and dead loads. The final step is to determine how much foam can be attached to the housing unit 1 floor. Careful consideration of these measurements will result in the design of a durable floatation element 4 which is more than capable of lifting and holding the housing unit 1 completely above the floodwater level.

The liner 8 is fabricated to provide the finished foam floatation element 4 with a sloped edge 5. This shape allows water and debris to pass under and around the housing unit 1, with a minimum of resistance, much like a common river barge vessel. As part of the site grading, a depression 6 is created below the liner 8 to allow air flow, and to provide an initial water collection area during flooding. In an emergency situation, one inch of floodwater above ground level will fill the initial water collection cavity provided by the depression 6 below the housing unit 1 and lift the housing unit 1 eleven inches above the level of the surface water. Other special site grading precautions will be taken around the base of the housing unit 1 to prevent random water collection, such as earth berming, etc.

The floatation element 4 is biased in mass relative to the housing unit 1 "heavy portion" or "heavy side". When the liner 8 is placed into the site depression 6, the liner construction allows more foam to be placed under the heavier portion of the housing unit 1, to correct any imbalance that might be experienced during housing unit 1 floatation. Differing housing unit 1 floor plans will dictate the preferential placement of the required floatation element 4 thicker mass portion. The floatation element 4 can be adapted to lift any size or style Landlocked Floating Modular Housing Unit 1.

A set of four vinyl air bladders 25 attach to the outside base of the liner 8. The air bladders 25 serve as additional fine tuning means for floatation leveling. They serve to further correct any unforeseen imbalance experienced by the housing unit 1, after occupancy, such as heavy furnishings, etc. owned and placed by the resident. The air bladders 25 reside at the four outside perimeter comers of the housing unit 1, and are separately filled with compressed air by means of a small compressor located in the housing unit 1 backup utility room, and co-operate with a spirit level viewed by a homeowner. An air bleed means is provided for deflation of the air bladders 25, after floodwaters recede.

Outside the liner 8, and between the floatation elements 4 are separate holding tanks for: fresh water 11; and septic holding 10. The holding tanks 10 & 11 are preferably located along and underneath the mid-section beam 2a, for balance. A grey water intake pump 14 is connected to an external intake snorkel and filter assembly, for use in extended flooding conditions. The greywater intake pump 14, feeds filtered flood water to a water recycling filtration system 12, which is located in the housing unit 1 utility room. Clean outs and chases for primary service residential utilities are also provided as part of the floatation element 4. The primary service residential electrical, water, sewer, and gas line systems are easily and safely disconnected from, and reconnected to the housing unit 1, by means of a manual utility shutoff 19, which cooperates with a set of flexible utility connectors 20, and the flexible utility connectors 20 allow for a degree of Musing unit 1 floatation before disconnect is necessary.

During extended flooding conditions, when the housing unit 1 is in the floatation mode, and primary utilities are unavailable, or polluted, the housing unit 1 waste septic water is contained in a storage tank 10. A septic ejector pump 13 serves to clean out the septic storage tank 10, after floodwaters recede, discharging into the municipal sewer system. Gray water is taken up from the floodwater under the housing unit by means of the intake pump 14, purified in a recycling filter system 12 and released into the fresh water tank 11. A small generator system 17 maintains lights, utilities and small appliances, and is provided with a utility interface 18. Alternatively, a solar photovoltaic and solar hot water system 16 could be utilized to provide electrical utility and domestic hot water.

An additional series of four or more round, hollow, segmented, extendable piers 28 are located at the perimeter of the housing unit 1, and are securely connected to the foundation beams 2. The extendable pier 28 array serves as a guide to keep the housing unit 1 "on station" as floodwaters rise and recede. The extendable piers 28 each contain three segments, the upper segment 28a; the intermediate segment 28b; and the lower segment 28c. Each segment 28(a,b,c) is of ten to twenty feet in overall length, and the segments 28(a,b,c) will snugly nest inside one another, and fit together in a tight telescoping slip-fit arrangement. These extendable piers 28 are preferably constructed of tubular steel, although reinforced plastic or fiberglass tubular materials may be employed. The lowermost segment 28a is preferably constructed with a one-eighth inch wall thickness, the intermediate segment 28b is preferably constructed with a three-eighths inch wall thickness, and the upper segment is preferably constructed with a one-half inch wall thickness. This wall thickness increase provides a desired structural rigidity for the extendable piers 28 during full extension. The segments 28a,b,c, are factory assembled, and are lubricated with water-repellent grease, through use of grease zerks 34 located upon the outer faces of each segment 28b,&c. The grease fills the minor void present between the tightly fitted telescoping segments 28a,b,&c, during the resting position, and helps to keep corrosion from occurring.

The upper 28a and intermediate 28b segments have a plurality of fiat plates 31 attached at a right angle to their outermost faces. The plates 31 reside near the lowermost point of the respective pier segment. These plates 31 are provided with a plurality of grooves 33, which are machined into the plate 31 outermost perimeter edge. The plates 31 are vertically offset from one another, which provides a vertical offset for the groove 33 position relative to the adjacent plate 31. The grooves 33 allow for a passage of water contained internal to the extendable piers 28, through the grooves 33, to provide for a type of damper or shock absorber means associated with the extendable piers 28. The uppermost plate 33 provides a travel stop for the vertical rise experienced by the extendable pier 28 segments during housing unit 1 floatation. The uppermost end of the upper segment 28a, of the extendable pier 28 is closed off, or capped solidly at both ends of its length, to provide additional floatation buoyancy. All other pier segments are capped off at the base only, and the top is open, to receive the telescoping segments. The uppermost end of the upper segment 28a is fitted with a foundation beam engaging bracket 29. The beam engaging bracket 29 is bolted to the perimeter foundation beams 2, and secures the extendable pier, 28 to the housing unit 1 thereby.

A horizontal series of small-diameter, upwardly sloping holes 24 penetrate the uppermost wall of the intermediate segment 28b, and the lower segment 28c. During floodwater conditions, these holes 24 allow water to flow into the segments 28b&c, through a suction generated by the float and lifting of the buoyant housing unit 1 upon the floodwaters. The upward slope of the hole array 24 prevents the uptake of silt, debris and the like by the segments 28b&c. The thusly contained water acts as a damper to oscillations which may be encountered by the housing unit 1.

Accordingly, floodwater interaction with the plates 31 and grooves 33 located inside the extendable segments 28b&c, provides for a shock absorber action that will perform well no matter what the extense of the extendable pier 28 may be—either fully extended or partially extended. Water contained therein is evacuated as the segments 28a,b,c, return to resting position, after the floodwater recedes, and the housing unit 1 lowers. Cleanouts 32 Or "freezeplugs" are provided in each of the intermediate 28b, and lower 28c, segments, to assist a worker in mechanically removing any remaining water contained therein, after housing unit 1 lowering, when floodwaters recede.

Each of the extendable piers 28 utilized in anchoring the housing unit 1 are driven deep into the earth at the site, the lower segment 28c being buried and surrounded with a massive concrete footing 27, with the other pier segments being contained therein. The total weight of each extendable pier 28 and its concrete footing 27 is approximately four tons.

A semi-rigid flexible skirting 7 is attached to the housing unit 1 exterior. The skirting 7 attractively covers the opening left between grade level and the perimeter foundation beams 2 of the housing unit 1. The skirting 7 remains attached to the housing unit 1 as the housing unit 1 rises or lowers with floodwater levels. The skirting 7 covers the wooden piers 21 and the extendable piers 28, and the skirting is not attached to any piers utilized herein. The skirting 7 extends fully to grade level from the housing unit 1 lower framework, where it is attached to the foundation beam 2. This skirting 7 and any portions thereof is easily removed by service personnel to aid in maintenance and servicing of the pier assemblies 28, floatation elements, 4 utility connectors 20, air bladders 25, and in drainage of the site excavation 6, after floodwaters recede.

Although the present invention has been described herein with particularity, relative to the foregoing detailed description of the preferred embodiment. I wish it to be understood that this description of the disclosed invention is done to fully comply with the requirements of 35 USC Sec. 112, and is not intended to limit the invention in any way. Various modifications, additions, and applications other than those specifically outlined herein will be readily apparent, without departing from the spirit and scope of my invention, to those having ordinary skill in the art. Accordingly, it is desired that the scope of my present invention be determined not entirely and exclusively by the foregoing specification, and the embodiments illustrated, but that it be defined by the appended claims and their legal equivalents.

What is claimed is:

1. An improved modular housing unit of the type employing post tension frame construction, intended solely for building use on flood plain land areas, bays, and estuaries, and the said modular housing unit is floatable in its entirety, and is slidably moored and anchored to the building site, to permit substantially unrestricted independent movement of the housing unit in a direction substantially perpendicular to a body of impinging floodwater, comprised of:

a factory built modular housing unit, available in many differing floor plans, which modular housing unit is built in two or more linear portions for later joining; with multi-ply, laminated lower perimeter framework with floor joists interspersed and connected therewith;

a steel threaded clamping rod which secures and strengthens the perimeter framework of the linear portions and holds the portions together to form a complete modular housing unit assembly; and a flattened, expanded foam-type rigid floatation element which resides below the flooring of the modular housing unit assembly, and completely extends to the outermost perimeter of said housing unit flooring, and projects downwardly therefrom, in separate, truncated, U shaped pontoons placed below the flooring and lower perimeter framework of said modular housing unit assembly;

a membrane which contains and defines the outward shape and positioning of the foam floatation element, and the membrane anchors the foam floatation element onto the housing unit;

a plurality of inflatable and deflatable air bladders, adjoining the floatation element, the air bladders are positioned at the four corners of the housing unit, to provide additional floatation leveling and fine tuning during housing unit floatation and occupancy;

a plurality of rot-proofed wooden piers which reside in the earth at the building site, and project upwardly from the earth, providing a stable dryland foundation resting means for the housing unit perimeter;

a plurality of tubular, segmented, telescoping piers which reside in the earth at the building site, and project upwardly from the earth, and which uppermostly are attached to the housing unit assembly, at the housing unit perimeter, to provide a vertically moveable and height adjustable anchor means for permanently anchoring the housing unit on dry land, and during housing unit floatation on floodwaters;

a shock absorbing, oscillation damping means contained internal to the plurality of said telescoping piers;

a building site excavation sized to receive the said floatation element in its entirety, the site excavation is dug out and located under the housing unit assembly;

a flexible, removable skirting, located between grade level and the housing unit lower perimeter framework, and connected only to the housing unit lower perimeter framework, not connected to any portion of any said pier pluralities;

a plurality of flexible city utility connectors, which allow for a preset degree of housing unit upward movement before utility disconnect;

a series of backup systems to provide utilities and water supply to the housing unit during extended floodwater presence, including;

a plurality of holding tanks, for fresh water supply and septic holding, residing below the flooring of said housing unit;

a intake pump with a filtered intake means directed toward the floodwater, and which intake pump serves to feed a greywater filtration and recycling system, which operates in conjunction with the said holding tanks;

a electric generation means, gasoline, propane or solar powered, with utility interface means;

a septic system ejector pump, releasably connected to the primary city sewer system that primarily serves the housing unit.

* * * * *